United States Patent [19]

Miles

[11] 4,396,141
[45] Aug. 2, 1983

[54] ACTUATOR MEANS FOR A REMOTE TEMPERATURE CONTROL UNIT AND METHOD FOR MAKING SAME

[75] Inventor: Floyd D. Miles, Beaverton, Oreg.

[73] Assignee: Peco, Inc., Oreg.

[21] Appl. No.: 192,623

[22] Filed: Sep. 30, 1980

[51] Int. Cl.³ .......................... B23K 1/20; B23K 1/19
[52] U.S. Cl. ..................................... 60/527; 228/238; 228/263.18; 228/232; 228/454; 228/127
[58] Field of Search .................. 228/232, 238, 263 G; 148/127, 12.7 C; 29/454; 73/368.7; 92/45

[56] References Cited

U.S. PATENT DOCUMENTS

| 2,071,583 | 2/1937 | Schutt | 29/454 X |
| 2,569,058 | 9/1951 | Hobbs | 148/127 |
| 2,756,777 | 7/1956 | Bourns et al. | 29/454 X |
| 3,290,182 | 12/1966 | Eichelman et al. | 148/127 X |
| 3,557,423 | 1/1971 | Wolfe et al. | 148/127 X |
| 4,179,314 | 12/1979 | Wikle | 148/12.7 C |
| 4,231,508 | 11/1980 | Wagner | 228/232 X |

*Primary Examiner*—Kenneth J. Ramsey
*Attorney, Agent, or Firm*—Jay M. Cantor

[57] ABSTRACT

An actuator means for a remote temperature control unit includes a base member onto which an edge of a diaphragm is crimped, a ring of solder is placed on the base member adjacent the crimped edge of the diaphragm. This assembly is placed in an oven in an inert environment with the temperature at about 575°–585° F. for about three hours. The temperature is then raised to 615°–625° F. for about twenty minutes to melt the solder to sealingly solder the diaphragm to the base member. The oven is cooled to about 250° F. while it is in an inert condition and the finished assembly is removed from the oven.

6 Claims, 3 Drawing Figures

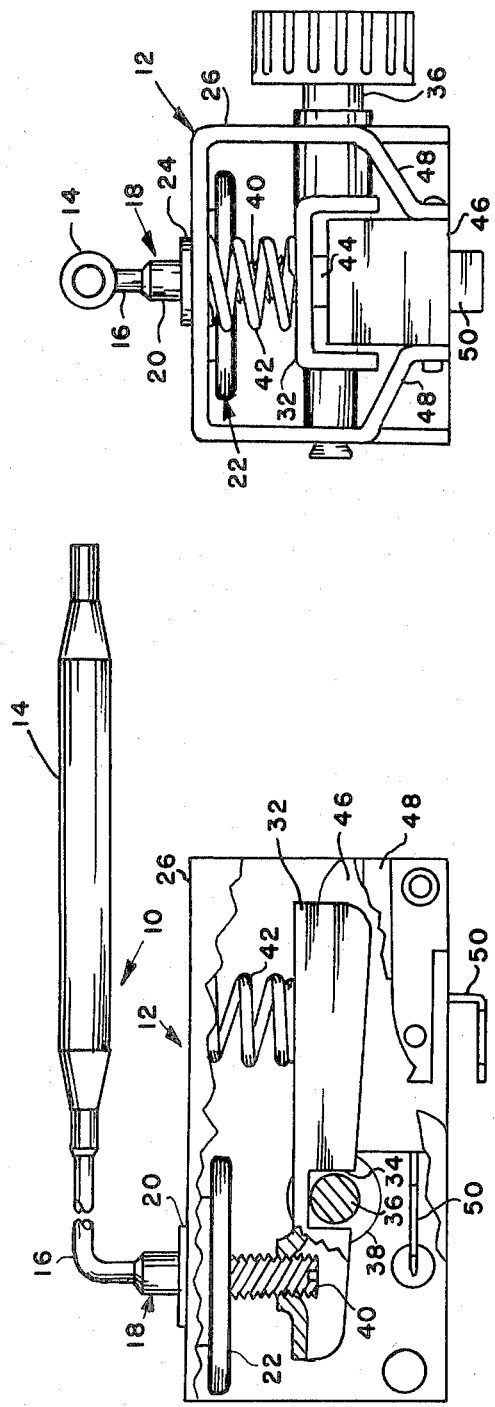
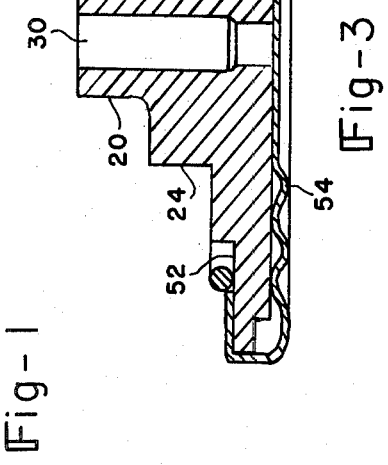

ACTUATOR MEANS FOR A REMOTE TEMPERATURE CONTROL UNIT AND METHOD FOR MAKING SAME

BACKGROUND OF THE INVENTION

Bulb and capillary thermostats are known as remote temperature control units for controlling the temperature in water heaters, hot tubs, water beds, spas, coffee and hot drink dispensers and the like.

The actuator assembly of a thermostat includes a head assembly, a bulb, and a capillary interconnecting the head assembly and bulb. A liquid is contained in the bulb and it is susceptible to temperature variations that cause the metal diaphragm to expand and contract thereby operating the thermostat.

If the diaphragm is not properly age hardened, the thermostat will not operate precisely at higher temperatures. Thus, it is important that the diaphragm be age hardened to enable the thermostats to operate accurately.

SUMMARY OF THE INVENTION

The present invention relates to temperature control units and more particularly to an actuator assembly for the temperature control unit and a method for making the actuator assembly.

The present invention is realized by assembling a metal diaphragm onto an actuator base by crimping the edge of the diaphragm onto the edge of the actuator base. A solder ring is placed into position onto the actuator base adjacent the crimped edge of the diaphragm. The assembled actuator base and diaphragm are placed in an oven having an inert atmosphere of a suitable gas at about 575°-585° F. for about three hours, which age hardens the diaphragm material. The temperature is then raised to about 615°-625° F. for about 20 minutes to flow the solder thereby soldering the diaphragm edge to the edge of the actuator base and forming a seal therebetween. The oven is cooled to about 250° F. while it is in an inert condition which will prevent oxidation of the diaphragm. The finished assembly is removed from the oven.

An object of the present invention is to provide an actuator means for a temperature control means.

Another object of the present invention is the provision of an age-hardened diaphragm as part of an actuator means for a temperature control means.

A further object of the present invention is to provide an actuator means for a temperature control means that is precise in operation.

An additional object of the present invention is a method of making an actuator means for a temperature control means that has an age-hardened diaphragm which is soldered to a base member during the age-hardening period.

Other objects, advantage and features of the present invention will be apparent to persons skilled in the art from the following detailed description of a preferred embodiment of the invention with reference to the attached drawing.

THE DRAWING

FIG. 1 is a side elevational view with parts cut away and parts in cross section of a temperature control assembly;

FIG. 2 is a front elevational view of the thermostat; and

FIG. 3 is a cross-sectional view of the actuator head.

DETAILED DESCRIPTION OF THE INVENTION

FIGS. 1 and 2 illustrate the temperature control assembly 10 and the thermostat 12 thereof. The temperature control assembly includes a metal bulb 14, a metal capillary 16 and an actuator head 18 which includes a metal base 20 and a metal diaphragm 22. Bulb 14 has a temperature sensitive liquid such as, for example, xylene or the like therein and bulb 14, capillary 16 and actuator head 18 are soldered together to form a temperature actuating assembly whereby bulb 14 is positioned where temperature variations take place and bulb 14 will sense these temperature variations.

An annular projection 24 of base 20 is located in an opening of metal mounting frame 26 of U-shape configuration with surface 28 of base 20 abutting against the inside surface of frame 26. A bore 30 is located in base 20 to enable the temperature-sensitive liquid to move diaphragm 22.

A U-shaped actuating arm 32 has U-shaped slots 34 in its sides which engage a cam shaft 36 that is rotatably mounted in openings 38 in the sides of mounting frame 26. A calibration screw 40 is threadably located in actuating arm 32 and the outer end of screw 40 engages diaphragm 22 at its central area.

A coil spring 42 extends between actuating arm 32 and the inside surface of frame 26 thereby springably maintaining actuating arm 32 in engagement with switch-actuating member 44 of switch 46. Inwardly-directed legs 48 of mounting frame 26 mount switch 46 on mounting frame 26 so that switch 46 is positioned within actuating arm 32. Terminals 50 of switch 46 are connected to a heating or cabling means and each is activated or deactivated by switch 46 upon bulb 14 sensing temperature change thereby causing diaphragm 22 to expand or contract which in turn operates switch 46 via actuating arm 32, screw 40, spring 42 and the position of cam shaft 36.

A knob is mounted on shaft 36 to rotate cam shaft 36 to a selected temperature scale (not shown). Calibration screw 40 can be adjusted to enable the thermostat to operate within 1–2 degrees of the thermostat setting.

To manufacture actuator head 18, these steps are followed:

The actuator head, which is preferably made of brass, has an edge 22a of diaphragm 22 crimped onto surface 52 of base 20. Diaphragm 22 is preferrably made of beryllium copper and it has undulations 54 therein. A ring 56 of commercially-available solder that melts at about 590° F. is placed on surface 52 of base 20 adjacent crimped edge 22a of diaphragm 22.

This assembly of base 20, diaphragm 22 and solder ring 56 is placed in an oven which has an inert atmosphere of dry nitrogen, argon or the like and which is at a temperature of about 575°-585° F.

The assembly is kept in the oven at this temperature and in the inert atmosphere for about three hours. This age hardens the diaphragm so that it is not susceptible to temperature variations. The temperature of the oven is then raised to about 615°-625° F. for about 20 minutes which melts solder ring 56 thereby soldering crimped edge 22a of diaphragm 22 to base 20 and forming a seal therebetween.

The oven is then cooled to about 250° F. and the oven remains in an inert atmospheric condition during this cooling period and this will prevent oxidation of the diaphragm. The oven can be cooled faster by use of a heat exchange means or it can cool to 250° F. by itself.

The assembly is removed from the oven and allowed to reach ambient temperature whereupon base 18 is sealingly soldered to capillary 16.

It can readily be discerned, a unique actuator means and the method for making it for use in a remote temperature control unit has been disclosed. Although the invention has been explained with reference to a particular embodiment, it is to be appreciated that various adaptations and modifications may be made without departing from the appended claims.

The invention is claimed in accordance with the following:

1. A method of making an actuator means for a remote temperature control unit, comprising the steps of:
   providing a base member having surfaces on opposite sides thereof and a bore extending to one of said surfaces;
   positioning a diaphragm on the said side of said base to which said bore extends and extending said diaphragm to rest on the other of said surfaces;
   affixing an edge of said diaphragm onto said other surface of said base member;
   locating solder on said other surface adjacent said edge of said diaphragm;
   placing the base member and diaphragm assembly with said solder thereon in an oven having an inert atmosphere;
   raising the temperature of said oven to a first temperature below the melting point of said solder and maintaining said temperature for a predetermined period of time to age-harden said diaphragm;
   raising the temperature of said oven to a higher temperature than said first temperature to melt said solder and sealingly solder said diaphragm to said base member; and
   cooling said oven to a third temperature lower than said first temperature; and removing the soldered assembly from said oven.

2. A method according to claim 1 wherein said first temperature is about 575°–585° F.

3. A method according to claim 1 wherein said higher temperature is about 615°–626° F.

4. A method according to claim 1 wherein said third temperature is about 250° F.

5. A method according to claim 1 wherein said predetermined period of time is about three hours.

6. The product made by the process of claim 1.

* * * * *